United States Patent
Wang et al.

(10) Patent No.: US 10,251,068 B2
(45) Date of Patent: *Apr. 2, 2019

(54) SPECTRUM ACCESS FOR FIXED LTE USER EQUIPMENT

(71) Applicant: Google LLC, Mountain View, CA (US)

(72) Inventors: Jibing Wang, Saratoga, CA (US);
Mitchell Trott, San Mateo, CA (US);
Yi Hsuan, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/713,872

(22) Filed: Sep. 25, 2017

(65) Prior Publication Data

US 2018/0115908 A1 Apr. 26, 2018

Related U.S. Application Data

(63) Continuation of application No. 15/331,338, filed on Oct. 21, 2016, now Pat. No. 9,775,050.

(51) Int. Cl.
*H04W 16/14* (2009.01)
*H04W 60/00* (2009.01)
(Continued)

(52) U.S. Cl.
CPC ........... *H04W 16/14* (2013.01); *H04W 52/38* (2013.01); *H04W 52/50* (2013.01); *H04W 60/00* (2013.01);
(Continued)

(58) Field of Classification Search
None
See application file for complete search history.

(56) References Cited

U.S. PATENT DOCUMENTS

| 8,185,759 B1 * | 5/2012 | Li | G06F 13/105 |
| | | | 710/305 |
| 2012/0231825 A1 * | 9/2012 | Gossain | H04W 72/02 |
| | | | 455/509 |

(Continued)

FOREIGN PATENT DOCUMENTS

| EP | 1357704 | 10/2003 |
| WO | WO 2010008859 | 1/2010 |

OTHER PUBLICATIONS

Goldstein, Fred, "Initial CBSD-CDSD Requirements," Wireless Innovation Forum Contribution, Oct. 6, 2016, 4 pages.

(Continued)

*Primary Examiner* — Kodzovi Acolatse
(74) *Attorney, Agent, or Firm* — Honigman Miller Schwartz and Cohn LLP

(57) ABSTRACT

Spectrum access allocation processes and systems are described in which multiple tiers of predetermined transmission powers are enforced, and where access is established by transmission at or below the lowest predetermined transmission power. The allocation processes include provisioning a wireless interface between a spectrum access system and a user equipment that is not registered with the spectrum access system. The wireless interface permits data transfer at or below a first predetermined power setting. A request to register the user equipment with the spectrum access system is transmitted to a spectrum access server. The spectrum access server receives a message from the spectrum access server indicating that the user equipment has been registered with the spectrum access system. The user equipment is controlled to transmit data at a second predetermined power setting that is greater than the first predetermined power setting.

17 Claims, 6 Drawing Sheets

(51) Int. Cl.
| | |
|---|---|
| *H04W 72/04* | (2009.01) |
| *H04W 72/10* | (2009.01) |
| *H04W 52/38* | (2009.01) |
| *H04W 52/50* | (2009.01) |
| *H04W 88/02* | (2009.01) |
| *H04W 52/32* | (2009.01) |

(52) U.S. Cl.
CPC ....... *H04W 72/0473* (2013.01); *H04W 72/10* (2013.01); *H04W 52/325* (2013.01); *H04W 88/02* (2013.01); *H04W 88/021* (2013.01)

(56) References Cited

U.S. PATENT DOCUMENTS

| | | | |
|---|---|---|---|
| 2013/0176934 A1 | 7/2013 | Malladi et al. | |
| 2014/0237547 A1* | 8/2014 | Bose | H04W 52/367 726/3 |
| 2015/0156654 A1* | 6/2015 | Trott | H04W 16/14 370/252 |
| 2015/0373554 A1 | 12/2015 | Freda et al. | |
| 2016/0212624 A1* | 7/2016 | Mueck | G06F 17/30545 |
| 2016/0242031 A1* | 8/2016 | Ojanen | H04W 28/16 |
| 2016/0366655 A1* | 12/2016 | Schmidt | H04W 16/14 |

OTHER PUBLICATIONS

Federal Communications Commission "FCC Report and Order 15-47: Amendment of the Commission's Rules with Regards to Commercial Operations in the 3550-3650 MHz Band," FCC, Jul. 10, 2015, 187 pages.

International Search Report and Written Opinion issued in International Application No. PCT/US2017/046749, dated Oct. 19, 2017, 17 pages.

* cited by examiner

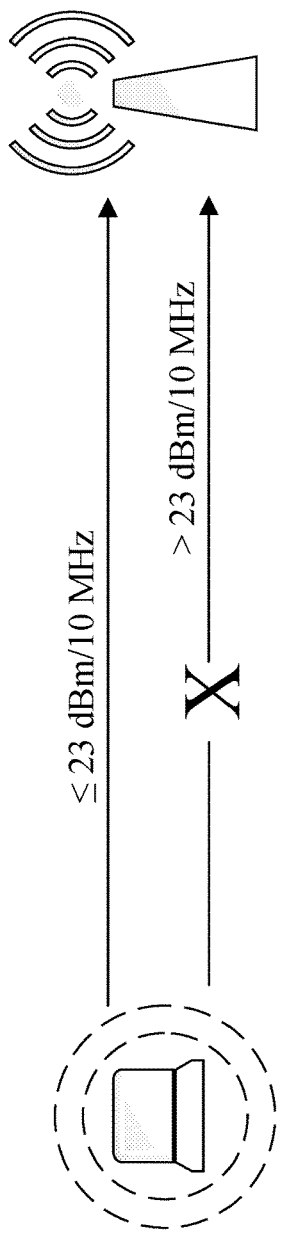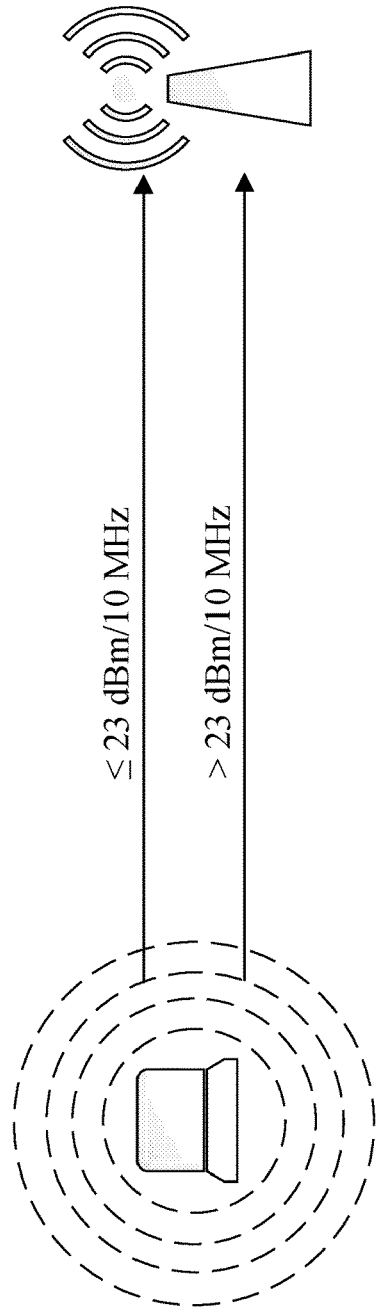
FIG. 1A
FIG. 1B

SPECTRUM ACCESS FOR FIXED LTE USER EQUIPMENT

CROSS-REFERENCE TO RELATED APPLICATION

This application is a continuation of U.S. application Ser. No. 15/331,338, filed Oct. 21, 2016, the contents of which are incorporated by reference herein.

BACKGROUND

Fixed Long term evolution (LTE) User Equipment (FLUE) can transmit wireless signals at various power levels to access a network. However, when attempting to access the Citizens Broadband Radio Service (CBRS) through a shared spectrum access system (SAS) framework, a FLUE cannot transmit signals that exceed certain power levels if the FLUE is not registered with the SAS. This restriction degrades the use and performance of the FLUE.

SUMMARY

In general, innovative aspects of the subject matter described in this specification can be embodied in a system that includes one or more computing devices and one or more storage devices storing instructions which when executed by the one or more computing devices, cause the one or more computing devices to perform operations. The operations include provisioning a wireless interface between a spectrum access system and a user equipment that is not registered with the spectrum access system. The wireless interface permits data transfer by the user equipment at or below a first predetermined power setting. The operations include transmitting, to a spectrum access server, a request to register the user equipment with the spectrum access system. The operations include receiving, from the spectrum access server, a message indicating that the user equipment has been registered with the spectrum access system. The operations include controlling the user equipment to transmit data at a second predetermined power setting that is greater than the first predetermined power setting in response to receiving the message indicating that the user equipment has been registered with the spectrum access system.

In some implementations, the user equipment includes a fixed long-term evolution (LTE) user equipment that includes a spectrum access client to control the one or more computing devices. Transmitting the request to register the user equipment with the spectrum access system includes transmitting the request at or below the first predetermined power setting.

In some implementations, the one or more computing devices include a proxy device that performs registration for one or more fixed long-term evolution (LTE) user equipment including the user equipment.

In some implementations, the operations further include establishing a second interface between the proxy device and the user equipment, and controlling, by the proxy device, signal transmission power of the user equipment.

In some implementations, the operations further include detecting that the user equipment is not connected to the proxy device, and transmitting data from the user equipment to the spectrum access system at or below the first predetermined power setting.

In some implementations, the first predetermined power setting is a 23 dBm/10 MHz equivalent isotropically radiated power (EIRP) setting, and the second predetermined power setting is greater than a 23 dBm/10 MHz EIRP setting.

In some implementations, the wireless interface is a fixed long-term evolution (LTE) air link to provide access to the spectrum access system at a Citizens Broadband Radio Service band. The Citizens Broadband Radio Service band includes one of more frequencies between 3.55 GHz and 3.7 GHz.

In some implementations, transmitting the request to register the user equipment with the spectrum access system includes transmitting data indicative of (i) a GPS location of the user equipment and (ii) an antenna pattern associated with the user equipment.

In some implementations, receiving the message indicating that the user equipment has been registered with the spectrum access system includes receiving data indicating that a license has been issued for the user equipment to access a Priority Access tier in the Citizens Broadband Radio Service band. The Citizens Broadband Radio Service band includes one of more frequencies between 3.55 GHz and 3.7 GHz.

Other aspects include corresponding methods, systems, apparatus, computer-readable storage mediums, and computer programs configured to implement the actions of the above-noted methods.

The details of one or more aspects described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A and 1B depict exemplary scenarios for accessing the CBRS using a FLUE.

Like reference numbers and designations in the various drawings indicate like elements.

DETAILED DESCRIPTION

Figure 2:
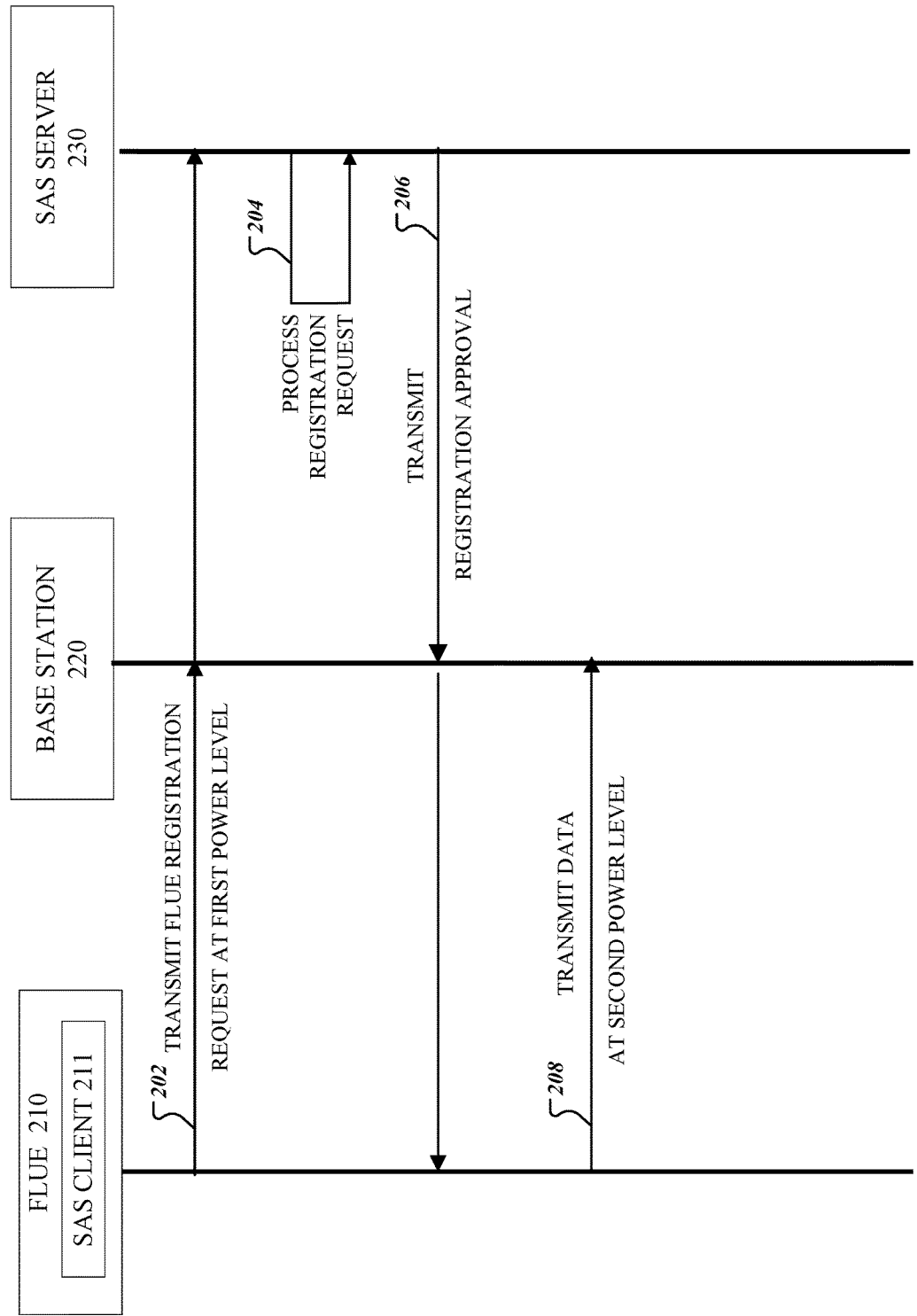
FIG. 2 depicts an exemplary flow diagram of a method for accessing the CBRS using a SAS client.

This disclosure generally relates to spectrum access allocation processes and systems in which multiple tiers of predetermined transmission powers are enforced, and where access is established by transmission at or below the lowest predetermined transmission power. Example implementations are described in the context of Citizens Broadband Radio Service (CBRS) spectrum access for fixed long term evolution (LTE) user equipment.

The CBRS band is available in the S-band and can be accessed by users through a three-tier shared Spectrum Access System (SAS) framework. The three-tiers include: Incumbent Access, Priority Access, and General Authorized Access (GAA). The Incumbent Access tier provides access to restricted authorized users and may not be open for access to users of the Priority Access and GAA tiers. To access the Priority Access tier, users must obtain a Priority Access License (PAL) and bid for a 10 MHz channel between 3.55 GHz and 3.65 GHz. The GAA tier provides more open and flexible access to users relative to the Incumbent Access and Priority Access tier. A user in the GAA tier may access any portion of the spectrum between 3.55 GHz and 3.7 GHz that is not being utilized by a user of a higher tier, for example, Priority Access. The three-tiered SAS framework provides a dynamic method of handling the increasing number of wireless devices seeking broadband network access through an efficient use and allocation of available spectrum.

LTE technology is being adapted to take advantages of the flexible, broadband access offered by CBRS. For example, LTE technology may be used as a last mile technology to serve remote homes or devices therein. These devices include fixed LTE user equipment (FLUE) and may provide users with broadband network access. In general, a FLUE may be any electronic device that is capable of transmitting wireless signals to a network at a power greater than 23 dBm/10 MHz equivalent isotropically radiated power (EIRP). The FLUE may be connected to or may have one or more integrated antennas with high directivity and transmission power. For example, a FLUE may be able to transmit signals having an EIRP up to 47 dBm/10 MHz using directional antenna(s).

To communicate with a wireless network, FLUEs may transmit signals at various power levels. However, a FLUE cannot access CBRS using signals transmitted at powers greater than a particular EIRP threshold level, e.g., a predetermined 23 dBm/10 MHz EIRP setting, unless the FLUE is already registered with the SAS. For example, as illustrated in FIG. 1A, an unregistered FLUE may only communicate with an evolved base station using signals having power equal to or less than 23 dBm/10 MHz EIRP. In contrast, as shown in FIG. 1B, a registered FLUE may communicate with an evolved base station using signals having power greater than, equal to, or less than 23 dBm/10 MHz EIRP. Confining unregistered FLUEs to transmit signals at powers equal to or less than 23 dBm/10 MHz EIRP can be problematic particularly when FLUEs are used in last mile technologies as the diminished signal power may result in signal loss and a break down in communications.

This specification describes solutions through which FLUEs may overcome the above-noted problems and access the CBRS through the SAS framework. As described in further detail below, a SAS client or SAS proxy device may be used to facilitate the registration of a FLUE and to enable the FLUE to access the CBRS through the SAS framework at signal powers greater than 23 dBm/10 MHz EIRP.

Figure 3:
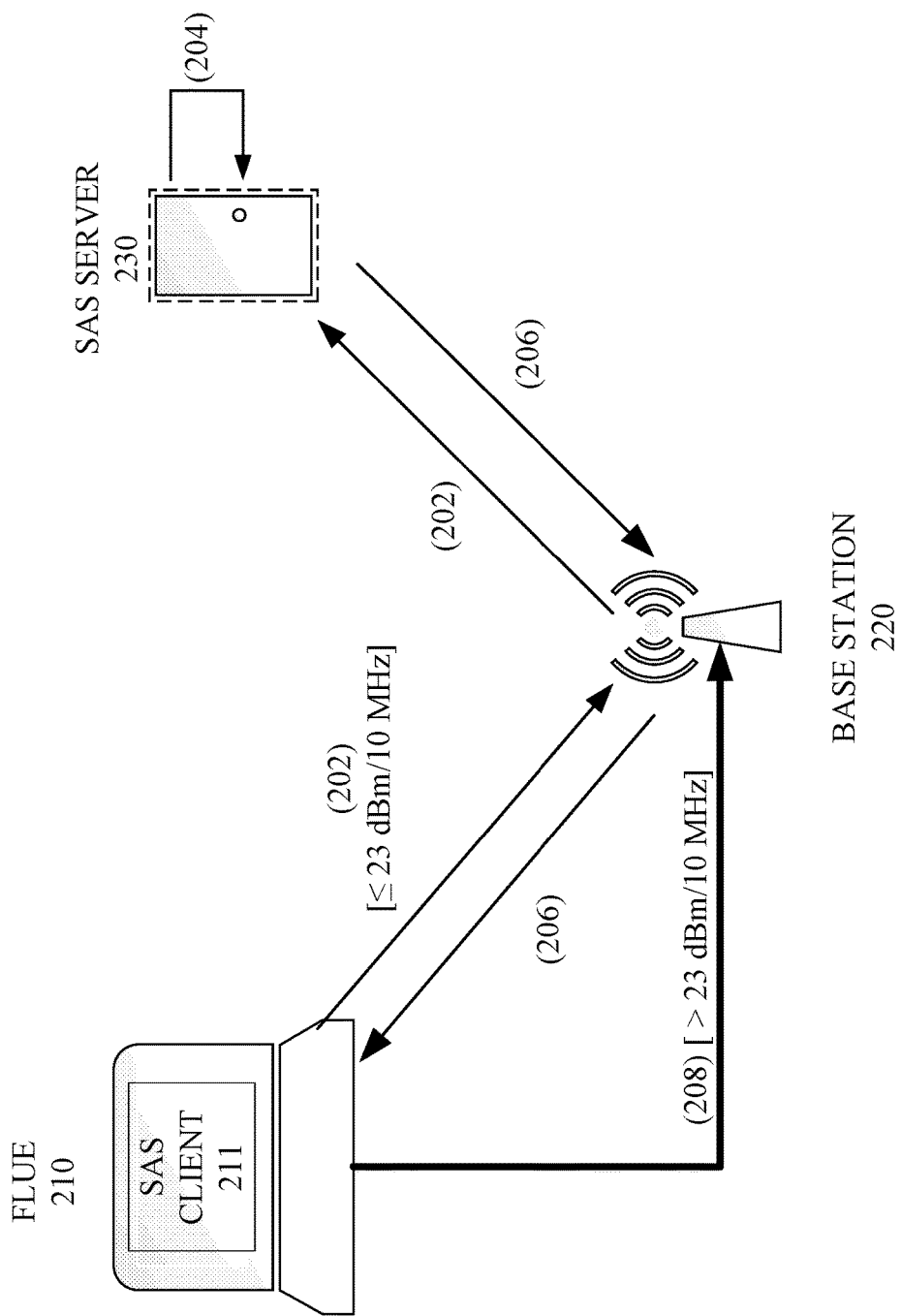
FIG. 3 depicts an exemplary system in which a FLUE having a SAS client accesses the CBRS.

Referring to FIGS. 2 and 3, a FLUE 210 may communicate with a SAS server 230 through a base station 220. The base station 220 may be an evolved base station used for LTE communications. The FLUE 210 includes a SAS client 211, which controls the FLUE 210 to perform the operations illustrated in FIG. 2. The SAS client 211 is a module that includes code for managing communications and interactions between the FLUE 210 and the SAS server 230. The SAS client 211 may obtain transmission permissions, protocols, and registration information from the SAS server 230 as described in more detail below.

Initially, the FLUE 210 is not registered with the SAS and therefore cannot communicate with the base station 220 and SAS server 230 with signals having a power greater than 23 dBm/10 MHz EIRP. At operation 202, the SAS client 211 controls the FLUE 210 to transmit a registration request to the SAS server 230 via base station 220. The registration request is transmitted at a power level equal to or less than 23 dBm/10 MHz EIRP. The registration request may include various suitable information about the FLUE 210, including, but not limited to, one or more of: (i) location information identifying a location of the FLUE 210; (ii) hardware information such as operating specifications of an antenna included in or attached to the FLUE 210; (iii) device information such as data identifying a make and model of the FLUE 210; (iv) software information such as data indicative of an operating system or protocol being executed on the FLUE 210; (v) user information indicative of a user associated with the FLUE 210; and (vi) credential information such as permissions or licenses for SAS access. In some cases, the registration request may also include a request to access a particular tier, for example the Priority Access tier, of the SAS framework.

The location information may be obtained through various suitable location services including, for example, a Global Positioning System (GPS) service. In some cases, the FLUE 210 may include an integrated GPS module to provide real-time location information of the FLUE 210. In some cases, the FLUE 210 may be attached or may communicate with a GPS device that can provide real-time location information of the FLUE 210. In some cases, a user interface may be provided by the FLUE 210 to enable a user or FLUE installer to enter location information and any other suitable information such as device and antenna information.

At operation 204, the SAS server 230 processes the registration request by verifying and authenticating the FLUE 210. To perform the verification and authentication, the SAS server 230 may verify whether the FLUE 210 is compatible for communications with the SAS based on the information provided in the registration request. For example, the SAS server 230 may determine whether the type of FLUE device, and hardware and software in the FLUE 210 can be used to access the CBRS spectrum through the SAS. If the FLUE 210 is not compatible for communications with the SAS to access the CBRS spectrum, the authentication and verification may fail.

As an example, the SAS server 230 may determine that the antenna type on the FLUE 210 cannot be used to transmit signals above the EIRP threshold level (e.g., 23 dBm/10 MHz EIRP) for accessing the CBRS spectrum as a registered device. As another example, the SAS server 230 may determine that the operating system or software protocols on FLUE 210 are outdated or cannot be used for accessing the SAS. A message indicating that registration of the FLUE 210 failed may then be transmitted back to the FLUE 210 through base station 220.

If the FLUE 210 is compatible for communications with the SAS, the SAS server 230 may determine whether the FLUE 210 can be allocated an available channel in the CBRS spectrum in accordance with SAS spectrum allocation rules. For instance, the SAS server 230 may scan the CBRS spectrum to determine available channels in the three-tier SAS framework.

If the registration request includes a request for Priority Access, the SAS server 230 may determine whether the FLUE 210 is associated with a user that has a PAL for spectrum access using the Priority Access tier. A PAL may be issued to a user that has successfully bid for a spectral portion between 3.55 GHz and 3.65 GHz. In general, SAS spectrum rules limit: the number of PALs allocated to a single applicant to a maximum threshold number, e.g., four; time periods associated with PALs; and a number of consecutive PALs issued to the single applicant for a particular spectral band. If the FLUE 210 is associated with an applicant that has a PAL for Priority Access spectral access, the SAS server 230 may allocate a Priority Access channel for FLUE 210 communications and may register the FLUE 210 and its allocated channel.

If the registration request includes a request for accessing the Incumbent tier, the SAS server 230 may determine whether the FLUE 210 has the required credentials for Incumbent spectrum access. For example, a security vehicle may request Incumbent access. The registration request sent by the SAS client 211 in the security vehicle includes a credential that certifies the security vehicle as belonging to an incumbent user. The SAS server 230 may communicate with a credential database to verify whether the credential included in the registration request matches an incumbent user's credentials in the credential database. If the credential matches, the security vehicle's registration request is verified and authenticated. The SAS server 230 may then allocate an Incumbent channel to the security vehicle, and register the allocation of the channel to the security vehicle.

If the registration request did not include a request to access a particular tier, the SAS server 230 may determine whether Priority Access channels or GAA channels between 3.55 GHz and 3.7 GHz can be allocated to the FLUE 210. The SAS server 230 may identify portions of the CBRS spectral band that are not assigned to a Priority Access or Incumbent user. In some cases, the SAS server 230 may allocate an unused Priority Access channel to a FLUE that does not have a PAL. If no Priority Access channel is available, the SAS server 230 may allocate an available GAA channel to the requesting FLUE.

In some cases, if no channel is available, the SAS server 230 may transmit a message back to the FLUE 210 indicating that registration failed and that no channel is currently available. In some cases, if a FLUE 210 requested Priority Access and did not have a PAL, the SAS server 230 may transmit a message back to the FLUE 210 indicating that registration failed because the FLUE 210 did not have a PAL. In some cases, if a FLUE 210 requested Priority Access and did not have a PAL, the SAS server 230 may allocate a GAA channel to the FLUE 210 and inform the FLUE 210 that the FLUE 210 has been allocated a GAA channel but not a Priority Access channel.

Referring back to FIGS. 2 and 3, after processing the registration request and allocating a spectral channel to the FLUE 210, in operation 206, the SAS server 230 transmits a registration approval message to the FLUE 210 via base station 220. The registration approval message may include information indicating the channel in the CBRS spectrum allocated to the FLUE 210, the tier associated with the allocated channel, and any other information (e.g., transmission power levels, transmission channel characteristics, signal modulation requirements, channel permissions, and channel allocation expiration time period) the FLUE 210 may need to access the allocated channel in the CBRS spectrum. If a FLUE 210 requested Priority Access, transmission of the registration approval message may include data indicating that a user associated with the FLUE 210 has a PAL for accessing the CBRS through the FLUE 210.

The SAS client 211 in the FLUE 210 extracts the information included in the message received from the base station 220 and SAS server 230. The SAS client 211 then utilizes the extracted information to configure the FLUE 210 for communications with the SAS and CBRS access. To configure the FLUE 210, the SAS client 211 may conduct one or more operations including, for example, setting of the transmission power level of a transmitter through which the FLUE 210 communicates with a base station. After being configured, at operation 208, the FLUE 210 may transmit data using signals that have power greater than 23 dBm/10 MHz EIRP to the base station 220 and may utilize the CBRS. Accordingly, by utilizing a SAS client 211, a FLUE 210 may be able to register and subsequently communicate through the SAS framework using signals that have powers greater than 23 dBm/10 MHz EIRP.

Figure 4:
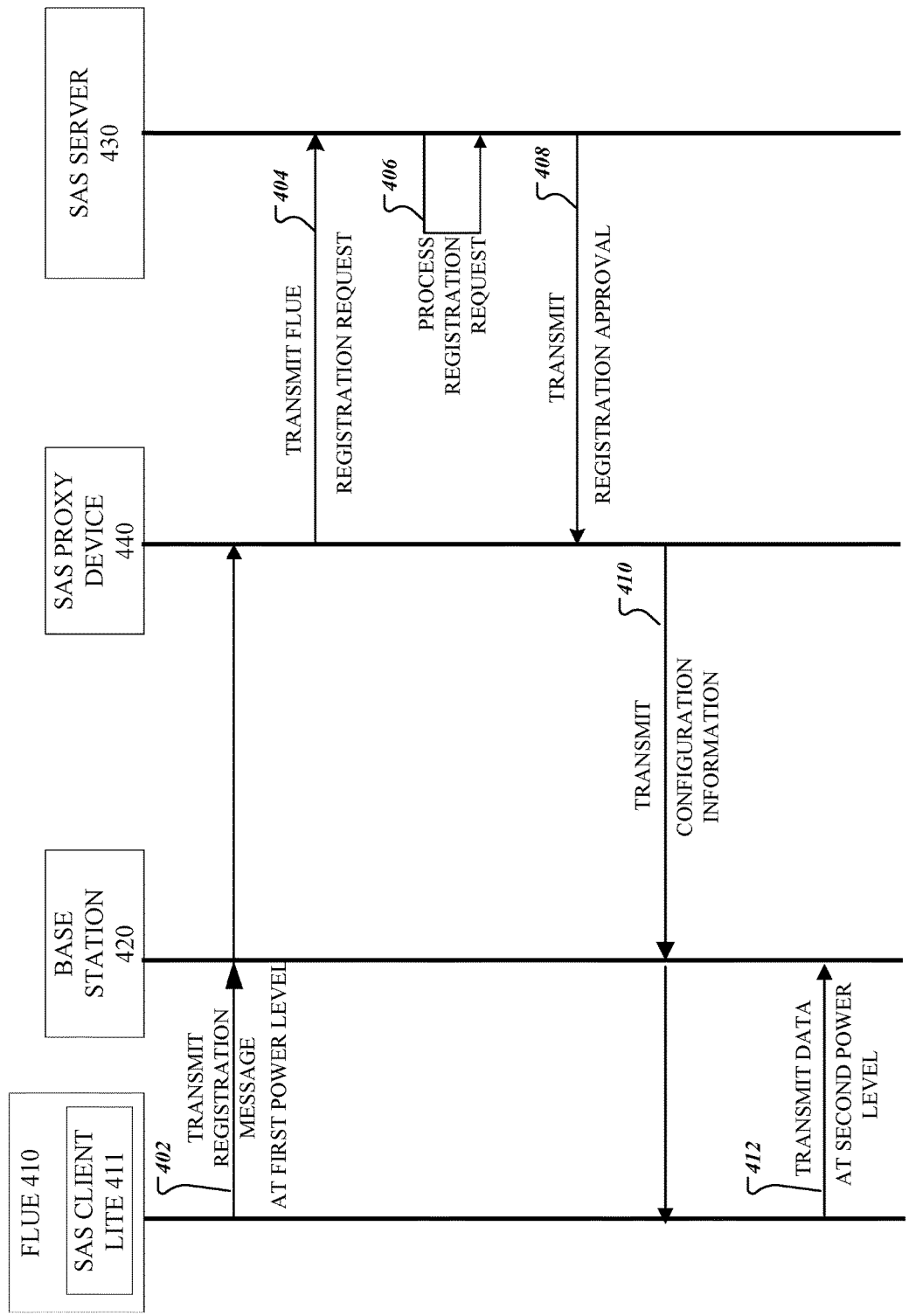
FIG. 4 depicts an exemplary flow diagram of a method for accessing the CBRS using a SAS proxy device.
Figure 5:
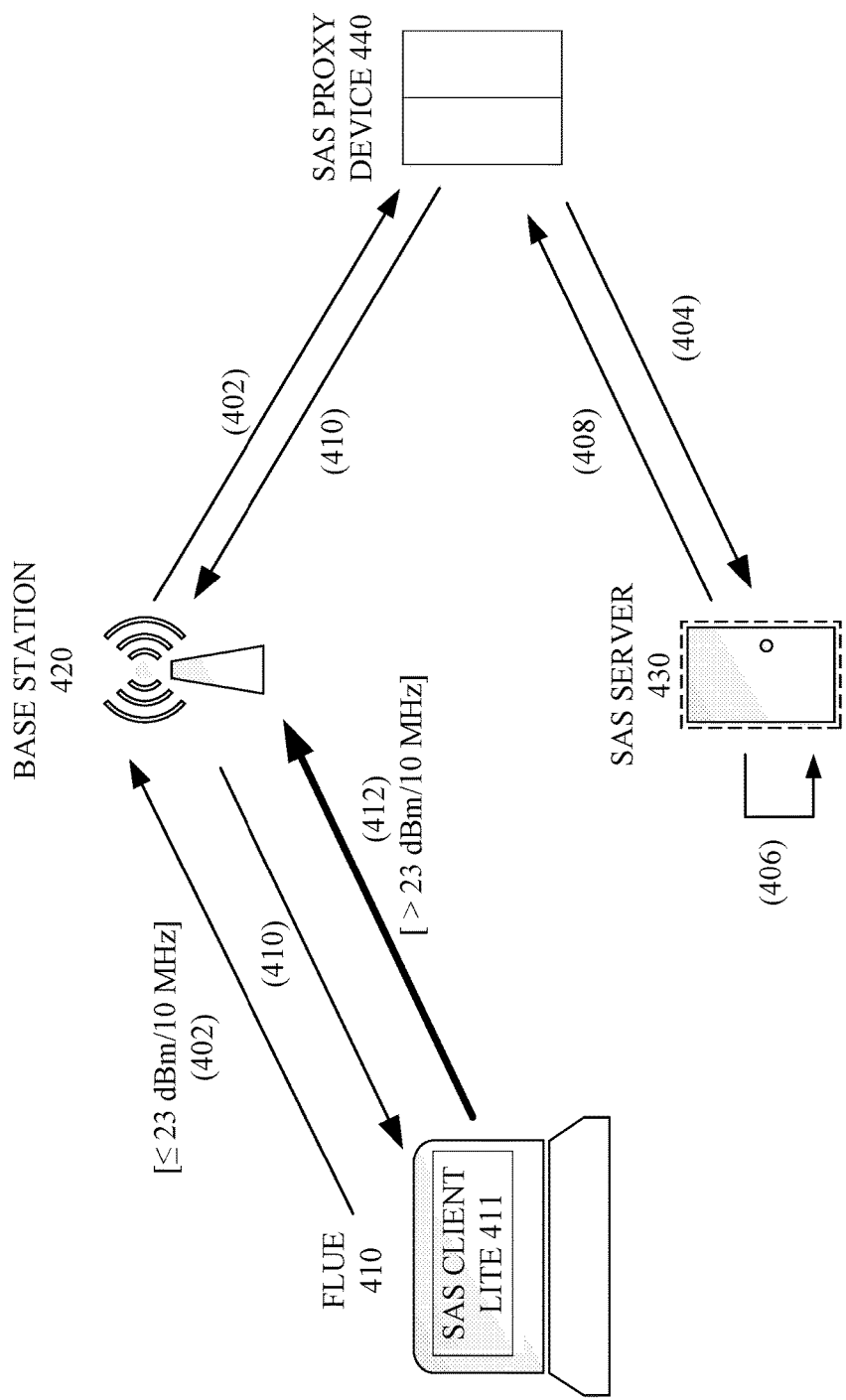
FIG. 5 depicts an exemplary system in which a SAS proxy device facilitates FLUE access to the CBRS.

In some implementations, as shown in FIGS. 4 and 5, a SAS proxy device may be used to configure and control the FLUE. In FIGS. 4 and 5, a FLUE 410, base station 420, SAS server 430, and SAS proxy device 440 may communicate with each other. The base station 420 may be an evolved base station used for LTE communications.

The SAS proxy device 440 handles SAS-related procedures and protocols on behalf of the FLUE 410. For example, the SAS proxy device 440 may facilitate the registration of a plurality of FLUEs, including FLUE 410, with the SAS server 430. The SAS proxy device 440 may update or modify protocols for communications between the FLUE 410 and the SAS server 430 without the FLUE 410 being aware of the change in protocol. In some cases, the SAS proxy device 440 may select channels or tiers in the SAS framework on behalf of FLUEs. In general, the SAS proxy device 440 may be implemented as a server in a network such as a cloud network, and may be any suitable combination of hardware and software. The SAS proxy device 440 can transmit wireless signals to a network at a power greater than a particular EIRP threshold level, e.g., 23 dBm/10 MHz EIRP.

The FLUE 410 may include a SAS client lite 411, which controls the FLUE 410 to perform the operations illustrated in FIG. 4. The SAS client lite 411 communicates with the SAS proxy device 440 and executes instructions provided by the SAS proxy device 440. The SAS client lite 411 may control the power of signals transmitted by the FLUE 410 based on instructions received from the SAS proxy device 440. For example, the SAS client lite 411 may, in certain instances, control the FLUE 410 to transmit signals below a particular EIRP threshold level, e.g., 23 dBm/10 MHz EIRP, and, in other instances, may control the FLUE 410 to transmit signals above the particular EIRP threshold level.

Referring to FIGS. 4 and 5, initially, the FLUE 410 is not registered with the SAS and therefore cannot communicate with the base station 420, SAS proxy device 440, and SAS server 430 with signals having a power greater than a particular EIRP threshold level. The FLUE 410 may communicate with the SAS using signals that have a power equal to or less than the particular EIRP threshold level, e.g., 23 dBm/10 MHz EIRP. At operation 402, the FLUE 410 transmits a registration message to the SAS Proxy Device 440 via the base station 420 to register itself with the SAS proxy device 440. The registration message may include various suitable information about the FLUE 410, including, but not limited to one or more of: (i) location information identifying a location of the FLUE 410; (ii) hardware information such as data indicating a type of antenna included in or attached to the FLUE 410, and antenna pattern and power configurations; (iii) device information such as data identifying a make and model of the FLUE 410; (iv) software information such as data indicative of an operating system or protocol being executed on the FLUE 410; (v) user information indicative of a user associated with the FLUE 410; and (vi) any PALs that can be utilized by the FLUE 410. In some cases, the registration message may also include a request to access a particular tier, for example the Priority Access tier, of the SAS framework.

The SAS proxy device 440 receives the registration message and stores the information provided by the registration message in a storage database. Additionally, in response to receiving the registration message, the SAS proxy device 440 establishes a secure communication channel with the FLUE 410, automatically generates a registration request, and transmits the registration request to the SAS server 430. The registration request may include portions of or all of the information provided by the registration message sent by the FLUE 210 including the request to access a particular tier.

The SAS server 430 performs operations 406 and 408 after receiving the registration request from the SAS proxy device 440. Operations 406 and 408 are the same as operations 204 and 206, respectively, except that the registration approval message is transmitted to the SAS proxy device 440 instead of a FLUE.

The SAS proxy device 440 receives the registration approval message and extracts the information included in the message. The registration approval message may include information indicating the channel in the CBRS spectrum allocated to the FLUE 410, the tier associated with the allocated channel, and any other information (e.g., transmission power levels, transmission channel characteristics, channel permissions, and channel allocation expiration time period) the FLUE 410 may need to access the allocated channel in the CBRS spectrum.

At operation 410, the SAS proxy device 410 transmits instructions to the SAS client lite 411 in the FLUE 410 on how to configure the FLUE 410 for accessing the CBRS through the SAS framework. For example, the SAS client lite 411 may receive instructions to set the transmission power level of the transmitter through which the FLUE 410 communicates with base station 420 to greater than the particular EIRP threshold level, e.g., 23 dBm/10 MHz EIRP. The instructions may also include additional information, such as transmission channel characteristics, and channel permissions, that the FLUE 410 utilizes for establishing communications with the SAS as a registered device.

After being configured, at operation 412, the FLUE 410 may transmit data using signals that have power greater than the particular EIRP threshold level, e.g., 23 dBm/10 MHz EIRP, to the base station 420. Accordingly, by utilizing a SAS client lite 411 and SAS proxy device 440, a FLUE 410 may be able to register and subsequently communicate through the SAS framework using signals that have power greater than 23 dBm/10 MHz EIRP.

If the connection between the FLUE 410 and SAS proxy device 440 is broken at any time, the FLUE 410 may continue to access the CBRS and communicate with the SAS using signals having a power equal to or less than the particular EIRP threshold level, e.g., 23 dBm/10 MHz.

Figure 6:
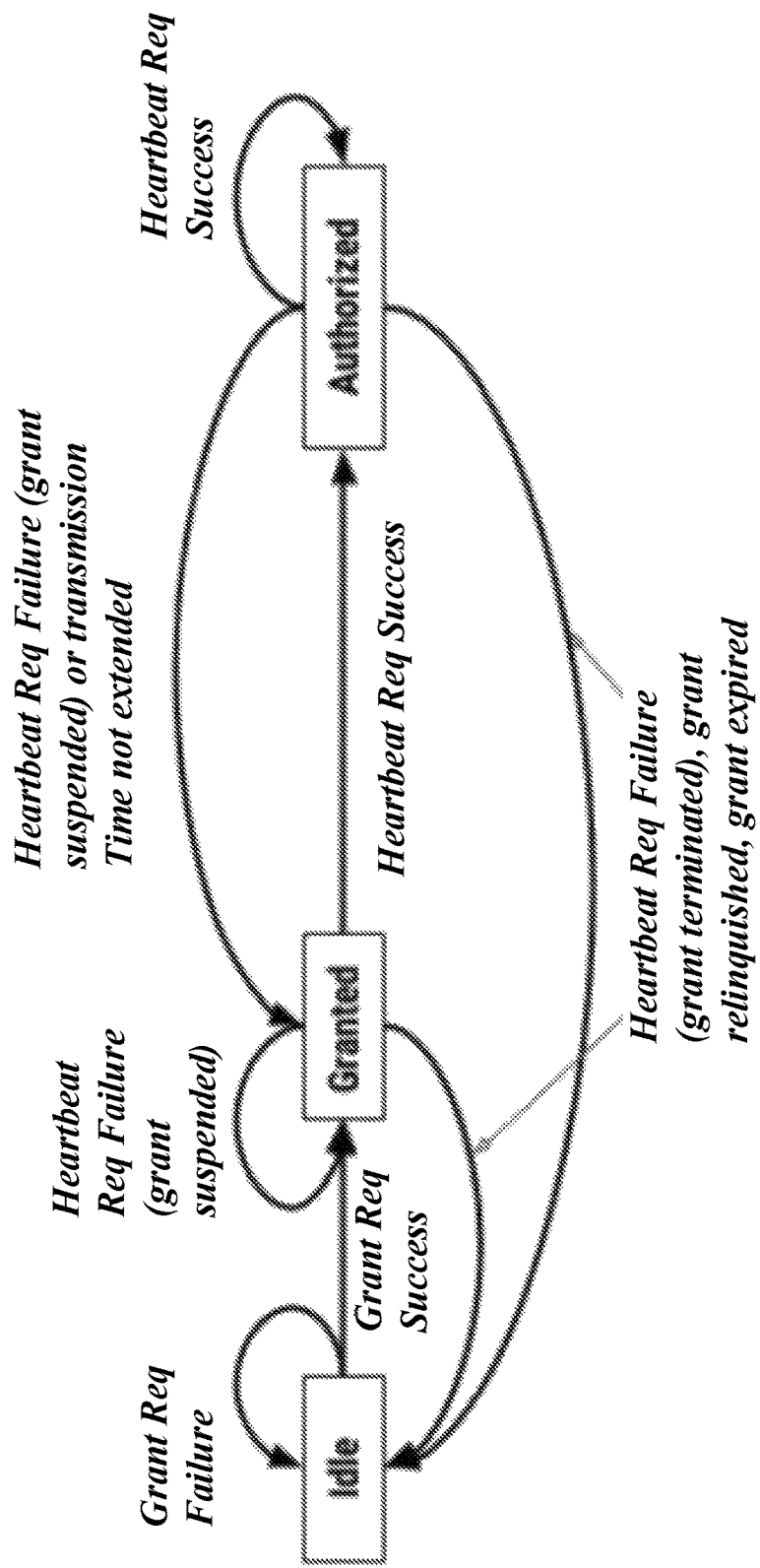
FIG. 6 depicts a state diagram for granting FLUE access to the CBRS.

Referring to FIG. 6, a state diagram for granting a FLUE access to the CBRS is illustrated. A FLUE operating in an "Idle" state may request to register with the SAS to access the CBRS. The request to register may be received by a SAS server from a SAS client or SAS proxy device connected to the FLUE. If the request to register is not granted or a time period for a granted registration request expires, the FLUE remains in an "Idle" state. If the request to register is granted, the FLUE may operate in a "GRANTED" state and a heartbeat process is initiated in which one or more heartbeat requests may be transmitted to and from the SAS server to determine a real-time operating status of the FLUE. If the heartbeat process succeeds and the operating status of the FLUE satisfies the authentication and verification procedure described above, the FLUE operates in an "Authorized" state, and is registered with the SAS. The heartbeat process may be periodically repeated. If subsequent heartbeat requests fail, a granted heartbeat request is terminated, or a time period for a granted heartbeat request expires, the FLUE may return to the "IDLE" or "GRANTED" state.

As noted above, when registered by the SAS, a FLUE may transmit signals having a power greater than a particular EIRP threshold level (e.g., greater than a predetermined 23 dBm/10 MHz EIRP setting). If the FLUE is not registered by the SAS, the FLUE can only transmit signals having a power less than or equal to the particular EIRP threshold level (e.g., at or below a predetermined 23 dBm/10 MHz EIRP setting).

The above examples have been described in the context of the CBRS and SAS framework. However, the spectrum access allocation process and systems describe herein can be applied to various suitable systems in which multiple tiers of predetermined transmission powers are enforced, and where access is dependent upon transmission power levels of a device seeking spectral access.

It should be understood that implementations and/or actions described in this specification may be implemented in digital electronic circuitry, or in computer software, firmware, or hardware, including the structures disclosed in this specification and their structural equivalents, or in combinations of one or more of them. Implementations may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors in computers that execute a computer program include, by way of example, both general and special purpose microprocessors, and any one or more processors of any kind of digital computer. Generally, a processor will receive instructions and data from a read only memory or a random access memory or both.

Aspects described herein may be implemented in a computing system that includes a back end component, e.g., as a data server, or that includes a middleware component, e.g., an application server, or that includes a front end component, e.g., a client computer having a graphical customer interface or a Web browser through which a customer may interact with an implementation, or any combination of one or more such back end, middleware, or front end components. The components of the system may be interconnected by any form or medium of digital data communication, e.g., a communication network.

The computing system may include clients, devices, and servers connected through one or more networks. In general, the one or more networks may include and implement any secured network architectures including, for example, an evolution of a Universal Mobile Telecommunications System (UMTS) architecture referred to as LTE. The one or more networks may include, for instance, a local area network (LAN), a wide area network (WAN), the Internet, a virtual LAN (VLAN), or any combination thereof.

The one or more networks may include one or more databases, access points, base stations, one or more servers, storage systems, cloud systems, and modules. For instance, the one or more networks may include an evolved base station that provides connections between a FLUE and a SAS server. The one or more servers may be a series of servers running a network operating system. The one or more servers may be used for and/or provide cloud and/or network computing. The one or more servers may include one or more SAS servers.

The databases in the networks may include a cloud database or a database managed by a database management system (DBMS). A DBMS may be implemented as an engine that controls organization, storage, management, and retrieval of data in a database. DBMSs frequently provide the ability to query, backup and replicate, enforce rules, provide security, do computation, perform change and access logging, and automate optimization. A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

In some implementations, the databases may include a credential database, user database, and registration database. The credential database stores data related to licenses that have been issued for SAS access, credentials of incumbent tier users, and additional permissions and certifications for provisioning SAS access. The registration database stores information indicating the spectral allocation to network devices such as a proxy device, a FLUE, or a base station. For example, the registration database may store one or more of data identifying a device, hardware specifications of the device, software specifications of the device, a channel allocated to the device, a tier in the SAS framework associated with the allocated channel, and a time period after which the channel allocation expires.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. Moreover, the separation of various system components in the embodiments described above should not be understood as requiring such separation in all embodiments, and it should be understood that the described program components and systems may generally be integrated together in a single software product or packaged into multiple software products.

It should be understood that the phrase one or more of and the phrase at least one of include any combination of elements. For example, the phrase one or more of A and B includes A, B, or both A and B. Similarly, the phrase at least one of A and B includes A, B, or both A and B.

Thus, particular implementations have been described. Other implementations are within the scope of the following claims. For example, the actions recited in the claims may be performed in a different order and still achieve desirable results.

What is claimed is:

1. A computer-implemented method comprising:
    transmitting, to a spectrum access server, a request to register a user equipment with a spectrum access system, the request being transmitted at a first predetermined equivalent isotropically radiated power (EIRP) power setting;
    receiving, from the spectrum access server, a message indicating that the user equipment has been registered with the spectrum access system, the message comprising information indicating (i) a channel, in the Citizens Broadband Radio Service (CBRS) spectrum, that is allocated to the user equipment by the spectrum access server, and (ii) a particular tier of a plurality of spectrum access system tiers through which the user equipment is permitted to communicate with the spectrum access system;
    in response to receiving the message indicating that the user equipment has been registered with the spectrum access system, controlling the user equipment to transmit data using the allocated channel in compliance with one or more rules associated with the particular tier, the data being transmitted at a second predetermined equivalent isotropically radiated power (EIRP) power level that is greater than the first predetermined EIRP power level;

extracting configuration data from the message indicating that the user equipment has been registered with the spectrum access system; and configuring the user equipment according to the extracted configuration data, the configuring comprising:

setting a transmission power level of an antenna of the user equipment according to the second predetermined equivalent isotropically radiated power (EIRP) power level that is specified by the extracted configuration data.

2. The computer-implemented method of claim 1, wherein:

the user equipment is a fixed long term evolution user equipment;

the first EIRP power setting is a power setting having an EIRP power less than or equal to 23 dBm/10 MHz;

the second EIRP power setting is a power setting having an EIRP power greater than 23 dBm/10 MHz; and the channel in the CBRS spectrum allocated to the user equipment by the spectrum access server is a 10 MHz channel between 3.55 GHz and 3.7 GHz.

3. The computer-implemented method of claim 1, wherein the plurality of spectrum access system tiers comprises an Incumbent Access tier, a Priority Access tier, and a General Authorized Access tier, and if the request to register included a request to access the Priority Access tier, the message received from the spectrum access server includes data indicating that a Priority Access License has been issued for the user equipment.

4. The computer-implemented method of claim 1, wherein the request to register includes:

(i) data identifying a location of the user equipment;
(ii) data indicative of one or more hardware components in the user equipment;
(iii) data indicative of a make and model of the user equipment; and
(iv) data indicative of a user associated with the user equipment.

5. The computer-implemented method of claim 1, wherein the request to register includes:

(i) data indicative of a credential to access the spectrum access system; and
(ii) an identification of the particular tier of spectrum access system.

6. The computer-implemented method of claim 1, further comprising:

determining, using a Global Positioning System (GPS) device, a real-time location of the user equipment; and
transmitting the real-time location to the spectrum access server.

7. A system comprising one or more computers and one or more storage devices storing instructions that, when executed by the one or more computers, cause the one or more computers to perform operations comprising:

transmitting, to a spectrum access server, a request to register a user equipment with a spectrum access system, the request being transmitted at a first predetermined equivalent isotropically radiated power (EIRP) power setting;

receiving, from the spectrum access server, a message indicating that the user equipment has been registered with the spectrum access system, the message comprising information indicating (i) a channel, in the Citizens Broadband Radio Service (CBRS) spectrum, that is allocated to the user equipment by the spectrum access server, and (ii) a particular tier of a plurality of spectrum access system tiers through which the user equipment is permitted to communicate with the spectrum access system;

in response to receiving the message indicating that the user equipment has been registered with the spectrum access system, controlling the user equipment to transmit data using the allocated channel in compliance with one or more rules associated with the particular tier, the data being transmitted at a second predetermined equivalent isotropically radiated power (EIRP) power level that is greater than the first predetermined EIRP power level;

extracting configuration data from the message indicating that the user equipment has been registered with the spectrum access system; and configuring the user equipment according to the extracted configuration data, the configuring comprising:

setting a transmission power level of an antenna of the user equipment according to the second predetermined equivalent isotropically radiated power (EIRP) power level that is specified by the extracted configuration data.

8. The system of claim 7, wherein: the user equipment is a fixed long term evolution user equipment;

the first EIRP power setting is a power setting having an EIRP power less than or equal to 23 dBm/10 MHz;
the second EIRP power setting is a power setting having an EIRP power greater than 23 dBm/10 MHz; and
the channel in the CBRS spectrum allocated to the user equipment by the spectrum access server is a 10 MHz channel between 3.55 GHz and 3.7 GHz.

9. The system of claim 7, wherein the plurality of spectrum access system tiers comprises an Incumbent Access tier, a Priority Access tier, and a General Authorized Access tier, and if the request to register included a request to access the Priority Access tier, the message received from the spectrum access server includes data indicating that a Priority Access License has been issued for the user equipment.

10. The system of claim 7, wherein the request to register includes:

(i) data identifying a location of the user equipment;
(ii) data indicative of one or more hardware components in the user equipment;
(iii) data indicative of a make and model of the user equipment; and
(iv) data indicative of a user associated with the user equipment.

11. The system of claim 7, wherein the request to register includes:

(i) data indicative of a credential to access the spectrum access system; and
(ii) an identification of the particular tier of spectrum access system.

12. The system of claim 7, wherein the operations further comprise:

determining, using a Global Positioning System (GPS) device, a real-time location of the user equipment; and
transmitting the real-time location to the spectrum access server.

13. One or more non-transitory computer-readable storage media comprising instructions, which, when executed by one or more computers, cause the one or more computers to perform actions comprising:

transmitting, to a spectrum access server, a request to register a user equipment with a spectrum access system, the request being transmitted at a first predetermined equivalent isotropically radiated power (EIRP) power setting;

receiving, from the spectrum access server, a message indicating that the user equipment has been registered with the spectrum access system, the message comprising information indicating (i) a channel, in the Citizens Broadband Radio Service (CBRS) spectrum, that is allocated to the user equipment by the spectrum access server, and (ii) a particular tier of a plurality of spectrum access system tiers through which the user equipment is permitted to communicate with the spectrum access system;

in response to receiving the message indicating that the user equipment has been registered with the spectrum access system, controlling the user equipment to transmit data using the allocated channel in compliance with one or more rules associated with the particular tier, the data being transmitted at a second predetermined equivalent isotropically radiated power (EIRP) power level that is greater than the first predetermined EIRP power level;

extracting configuration data from the message indicating that the user equipment has been registered with the spectrum access system; and configuring the user equipment according to the extracted configuration data, the configuring comprising:
setting a transmission power level of an antenna of the user equipment according to the second predetermined equivalent isotropically radiated power (EIRP) power level that is specified by the extracted configuration data.

14. The one or more non-transitory computer-readable storage media of claim 13, wherein:
the user equipment is a fixed long term evolution user equipment;
the first EIRP power setting is a power setting having an EIRP power less than or equal to 23 dBm/10 MHz;
the second EIRP power setting is a power setting having an EIRP power greater than 23 dBm/10 MHz; and
the channel in the CBRS spectrum allocated to the user equipment by the spectrum access server is a 10 MHz channel between 3.55 GHz and 3.7 GHz.

15. The one or more non-transitory computer-readable storage media of claim 13, wherein the plurality of spectrum access system tiers comprises an Incumbent Access tier, a Priority Access tier, and a General Authorized Access tier, and
if the request to register included a request to access the Priority Access tier, the message received from the spectrum access server includes data indicating that a Priority Access License has been issued for the user equipment.

16. The one or more non-transitory computer-readable storage media of claim 13, wherein the request to register includes:
(i) data indicative of a credential to access the spectrum access system; and
(ii) an identification of the particular tier of spectrum access system.

17. The one or more non-transitory computer-readable storage media of claim 13, wherein the operations further comprise:
determining, using a Global Positioning System (GPS) device, a real-time location of the user equipment; and
transmitting the real-time location to the spectrum access server.

* * * * *